United States Patent
Mayville et al.

(10) Patent No.: US 9,840,287 B1
(45) Date of Patent: Dec. 12, 2017

(54) FLUID MANAGEMENT SYSTEM FOR A WINDSHIELD WRAPPED VEHICLE PILLAR

(71) Applicant: FORD GLOBAL TECHNOLOGIES, LLC, Dearborn, MI (US)

(72) Inventors: Jeffrey Scott Mayville, Ypsilanti, MI (US); Patrick Reed, Livonia, MI (US); Thomas F. Boettger, Dearborn, MI (US); Michael A. Musleh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/350,891

(22) Filed: Nov. 14, 2016

(51) Int. Cl.
| | |
|---|---|
| *B62D 25/00* | (2006.01) |
| *B62D 25/24* | (2006.01) |
| *B60J 10/70* | (2016.01) |
| *B60J 10/34* | (2016.01) |
| *B60J 10/235* | (2016.01) |
| *B60J 1/02* | (2006.01) |

(52) U.S. Cl.
CPC ............... *B62D 25/24* (2013.01); *B60J 1/02* (2013.01); *B60J 10/235* (2016.02); *B60J 10/34* (2016.02); *B60J 10/70* (2016.02)

(58) Field of Classification Search
CPC ......... B62D 25/24; B60J 10/235; B60J 10/34; B60J 10/70; B60J 1/02
USPC ...................................................... 296/208
See application file for complete search history.

(56) References Cited

U.S. PATENT DOCUMENTS

| | | | |
|---|---|---|---|
| 2,888,134 A | 5/1959 | Antwerpen et al. | |
| 2,922,675 A | 1/1960 | Wernig et al. | |
| 4,518,197 A | 5/1985 | Gallitzendorfer et al. | |
| 4,728,145 A | 3/1988 | Benedetto | |
| 5,039,157 A | 8/1991 | Yada | |
| 5,344,205 A | 9/1994 | Yada et al. | |
| 5,618,079 A * | 4/1997 | Yukihiko | B29C 47/0023 296/93 |
| 6,095,586 A | 8/2000 | Yada et al. | |
| 6,647,915 B1 | 11/2003 | Bach | |
| 2007/0090668 A1* | 4/2007 | Yoshioka | B60J 10/70 296/208 |

FOREIGN PATENT DOCUMENTS

CN 202608691 U 12/2012

OTHER PUBLICATIONS

English Machine Translation of CN202608691U.

* cited by examiner

*Primary Examiner* — Joseph D Pape
(74) *Attorney, Agent, or Firm* — Jason C. Rogers; King & Schickli, PLLC

(57) ABSTRACT

A vehicle having a fluid management trim system includes a windshield supported along a lower edge by a cowl, along an upper edge by a roof, and along a side edge by a pillar. The pillar extends from a side door toward the roof, and a trim member extends along the side edge of the windshield forming a channel for guiding fluid along the windshield toward a drain. The side edge of the windshield may extend at least partially around the pillar. Even more, the side edge of the windshield may extend from the lower edge to a first position below the upper edge forming the drain. A portion of the trim member may be offset to the windshield forming the channel and extends from the lower edge to a second position below the upper edge and over the drain.

18 Claims, 3 Drawing Sheets

FLUID MANAGEMENT SYSTEM FOR A WINDSHIELD WRAPPED VEHICLE PILLAR

TECHNICAL FIELD

This document relates generally to fluid management for vehicle windshields, and more specifically to a fluid management trim used with a windshield wrapped A-pillar.

BACKGROUND

The A-pillar of a vehicle is the front most pillar or vertical support on a vehicle. All vehicle pillars are located around vehicle glass and operate to hold the glass in place and add structural integrity primarily to the roof of the vehicle. The A-pillar generally holds the windshield in place along driver and passenger side edges. Recent design trends following customer preferences indicate a desire for the A-pillar to appear dark or black in color such that the roof appears to be floating. To achieve the desired appearance, factory installed pillars are commonly covered. This has historically been achieved in three different ways.

First, the A-pillar is masked off and painted black after the vehicle is painted its original color. This approach, however, is time and labor intensive and perhaps most importantly requires a significant amount of additional painting facilities. Together, these additional requirements slow production and increase manufacturing costs. Second, black tape or the like is added to the A-pillar. While sufficient to create the desired black colored pillars, application of the tape is limited to certain contours and is also time and labor intensive. Even more, the tape may not be very robust in the field.

Third, a black colored applique is added. Typically, the applique is mounted to a bracket that is itself mounted to the A-pillar. Mounting the bracket to the A-pillar, however, is not without issues because the A-pillar is characteristically designed to be small and compact, and developing and packaging fasteners sufficient to hold the applique is challenging. The design issues are further complicated by recent increases in roof strength requirements that dictate the use of metal tubes to stiffen the A-pillars. Maintaining clearance for applique fasteners when using the metal tubes or the like is difficult.

Even more, post applied appliques are known to suffer from significant wind noise and/or retention issues. While the use of added epoxy adhesive can significantly reduce, if not eliminate, such issues, the additional adhesive increases the cost of manufacturing. The additional appliques and brackets also contribute to increases in manufacturing costs and add approximately 1.2 Kg to the overall weight of the vehicle. In addition, the appliques limit the range of travel of the windshield wipers as the wiper blades have to stop approximately 50 mm short of the applique to prevent contact with the applique. The result is that the wiper blades do not clear the windshield all the way to the A-pillars.

One solution for providing the customer with a blacked out A-pillar while overcoming the noted drawbacks associated with painting, taping and/or adding an applique, i.e., without reducing quality (e.g., through the introduction of wind noise due to a loose applique or a missing applique), increasing the cost or weight of the vehicle, and/or while maintaining at least the required strength in the pillar is to extend the edges of the windshield at least partially over the A-pillars. One potential drawback of such a solution, however, is the possible transference of fluid, whether rain, wiper fluid, or the like, from the windshield into the side windows in certain vehicle designs. Accordingly, a need exists for a fluid management system that ensures that fluid is prevented from entering the side windows. One way to meet these needs is using a trim member which moves the fluid along the windshield and away from the side windows.

SUMMARY

In accordance with the purposes and benefits described herein, a vehicle having a fluid management trim system is provided. The vehicle may be broadly described as comprising a windshield supported along a lower edge by a cowl, along an upper edge by a roof, and along a side edge by a pillar, the pillar extending between a side door and the roof, and a trim member extending along and supported by the side edge of the windshield forming a gutter within which fluid travels along the windshield. In one embodiment, the side edge of the windshield extends at least partially around the pillar.

In another possible embodiment, the trim includes an outboard portion attached to the edge of the windshield and an inboard portion offset to the windshield forming the gutter along at least a portion of the windshield.

In still another possible embodiment, the side edge of the windshield extends from the lower edge to a position below the upper edge forming a void in the windshield. In another, the inboard portion of the trim member is substantially flush with the windshield over at least a portion of the void.

In yet another possible embodiment, the vehicle includes a seal positioned between the windshield and the inboard portion of the trim member along the at least a portion of the void.

In another aspect of the invention, a fluid management trim system is provided. The fluid management trim system comprises a windshield having a drain formed in an upper corner; and a trim member extending along a side edge of the windshield forming a channel for guiding fluid along the windshield toward the drain, wherein a first inboard portion of the trim member is offset to the windshield forming the channel.

In another possible embodiment, a second inboard portion of the trim member is substantially flush to the windshield. In another, the second inboard portion of the trim member is substantially flush to the windshield over at least a portion of the drain.

In yet another possible embodiment, the fluid management trim system includes a seal positioned between the windshield and at least a portion of the second inboard portion of the trim member. In another, the seal is positioned between the windshield and the second inboard portion of the trim member over at least the portion of the drain.

In still another possible embodiment, a first outboard portion of the trim member is attached to the windshield and a second outboard portion of the trim member and a second inboard portion of the trim member are substantially flush to the windshield over the drain. In another, an outboard portion of the trim member is attached to the windshield.

In yet another possible embodiment, a second inboard portion of the trim member is substantially flush to the windshield. In another, the second inboard portion of the trim member is substantially flush to the windshield over at least a portion of the drain.

In other possible embodiments, the fluid management trim systems described above are incorporated into a vehicle.

In accordance with still another aspect, a vehicle having a fluid management trim system comprises a windshield supported along a lower edge by a cowl, along an upper edge by a roof, and along a side edge by a pillar, the pillar extending from a side door toward the roof, and a trim member extending along the side edge of the windshield forming a channel for guiding fluid along the windshield toward a drain, wherein the side edge of the windshield extends at least partially around the pillar.

In another possible embodiment, the side edge of the windshield extends from the lower edge to a first position below the upper edge forming the drain. In another, a portion of the trim member is offset to the windshield forming the channel. In still another, the portion of the trim member offset to the windshield extends from the lower edge to a second position below the upper edge and over the drain. In another possible embodiment, the pillar includes a face having an outer edge adjacent the door and an inner edge.

In the following description, there are shown and described several preferred embodiments of a fluid management trim system for a vehicle to provide a desired aesthetic look while lowering manufacturing costs and reducing wind related noise, and improving the overall aerodynamics of the vehicle. As it should be realized, the trim systems are capable of other, different embodiments and their several details are capable of modification in various, obvious aspects all without departing from the concepts as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the fluid management trim system and together with the description serve to explain certain principles thereof. In the drawing figures.

Reference will now be made in detail to the present embodiments of the fluid management trim system, examples of which are illustrated in the accompanying drawing figures, wherein like numerals are used to represent like elements.

DETAILED DESCRIPTION

Figure 1:
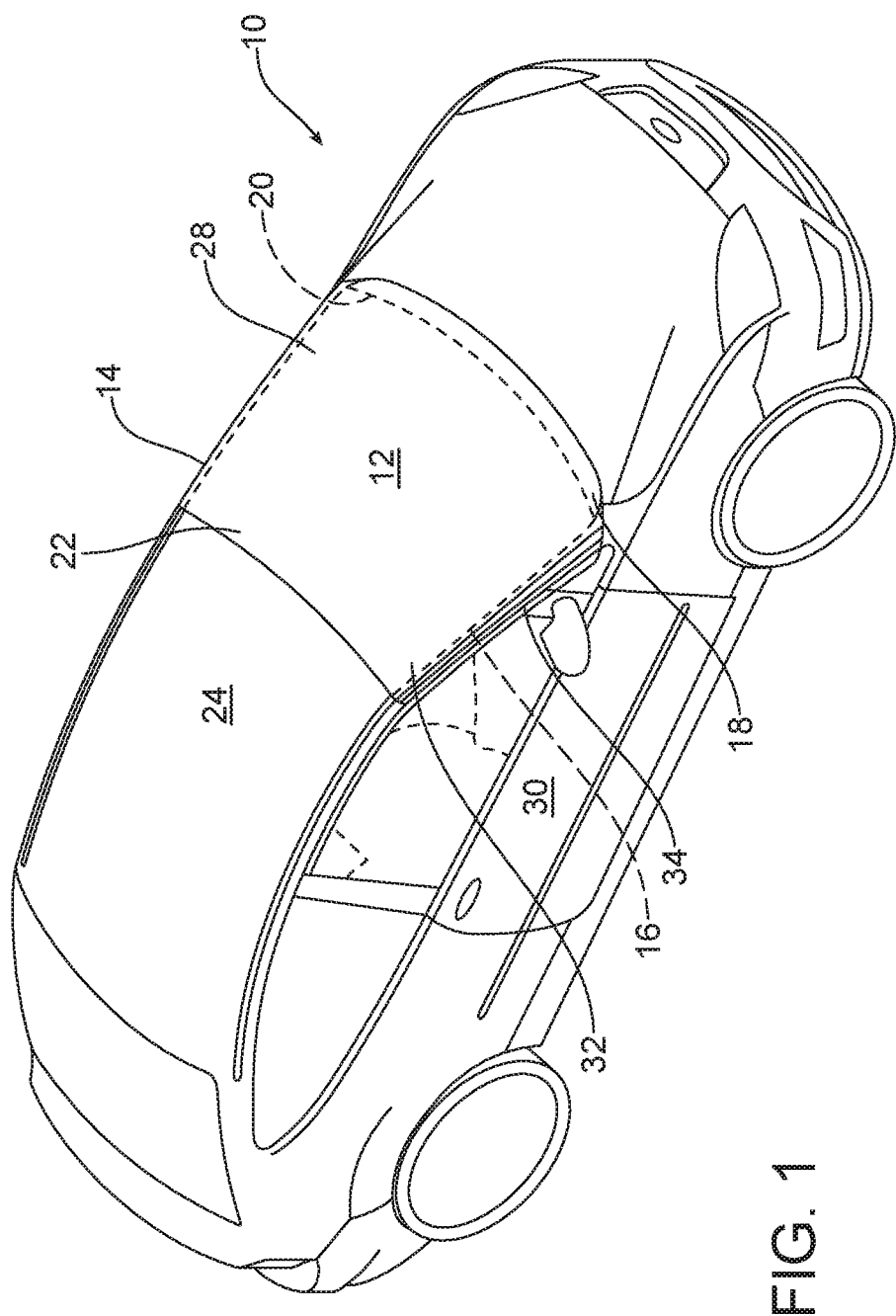
FIG. 1 is a perspective view of a vehicle having a windshield that extends around driver and passenger side A-pillars.

Reference is now made to FIG. 1 which shows an embodiment of a vehicle 10 having a windshield 12 that extends around driver and passenger side A-pillars 14, 16. As shown, the windshield 12 is supported along a lower edge 18 by a cowl 20 and along an upper edge 22 by a roof 24. The first, or driver side, A-pillar 14 extends between a driver side door 26 (and door seal 27) and the roof 24 and supports a driver side edge 28 of the windshield 12. A second, or passenger side, A-pillar 16 similarly extends between a passenger side door 30 and the roof 24 and supports a passenger side edge 32 of the windshield 12.

As described in greater detail below, a first trim member 34 extends along and is supported by the passenger side edge 32 of the windshield 12 forming a gutter within which fluid travels along the windshield. A second trim member 36, similarly extends along and is supported by the driver side edge 28 of the windshield 12 forming a gutter. It should be noted that references to edges of the windshield 12 (e.g., driver side edge 28) refer to a portion of a face or rear face of the windshield adjacent a side of the windshield, the line where the face meets the side of the windshield, and/or the side of the windshield).

Figure 2:
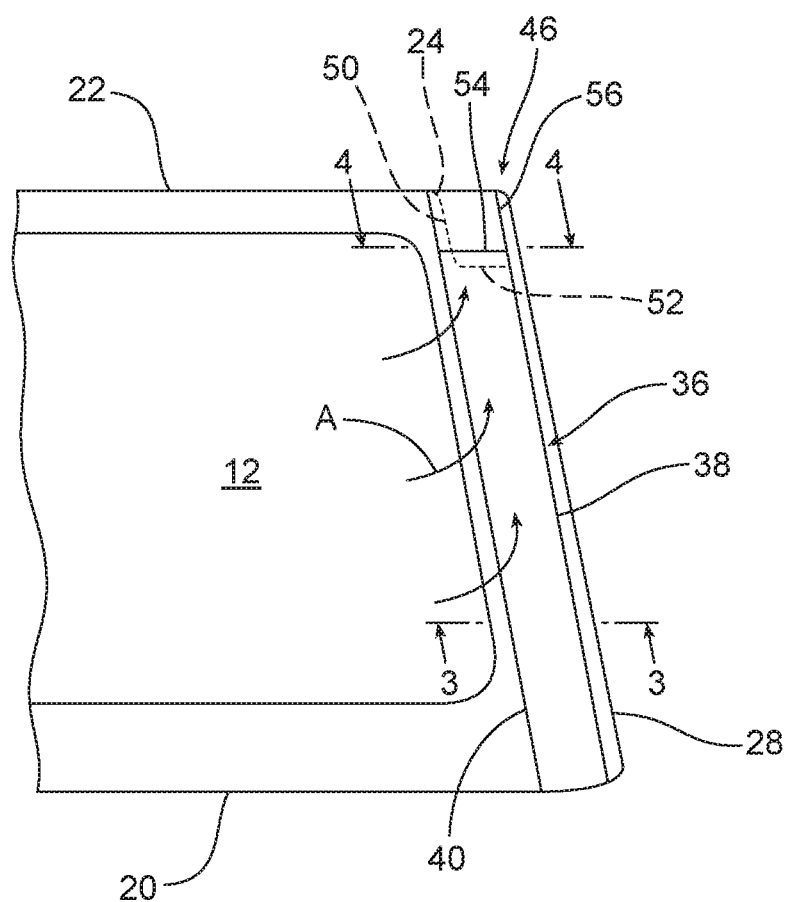
FIG. 2 is a partial front view of a windshield having a trim member attached thereto.

As shown in FIG. 2, the second trim member 36 extends along and is supported by the driver side edge 28 of the windshield 12. More specifically, the second trim member 36 is attached to a face of the windshield 12. In the described embodiment, the second trim member 36 is bonded to the face of the windshield utilizing an adhesive or the like. Of course, other methods of attaching the trim member may also be utilized and the trim member may be attached to a side of the windshield 12 or both. Although not shown in this figure, it should be noted that the first trim member 34 is similarly situated on the passenger side of the vehicle 10. Given the similarities and essentially mirrored image of the trim members in the described embodiment, the passenger side trim member will not be further described.

Figure 3:
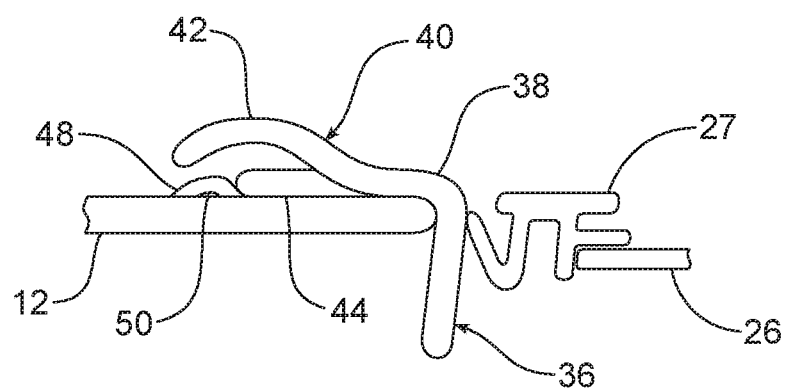
FIG. 3 is a partial cross-sectional view of the windshield and trim member along a driver side edge of the windshield.
Figure 4:
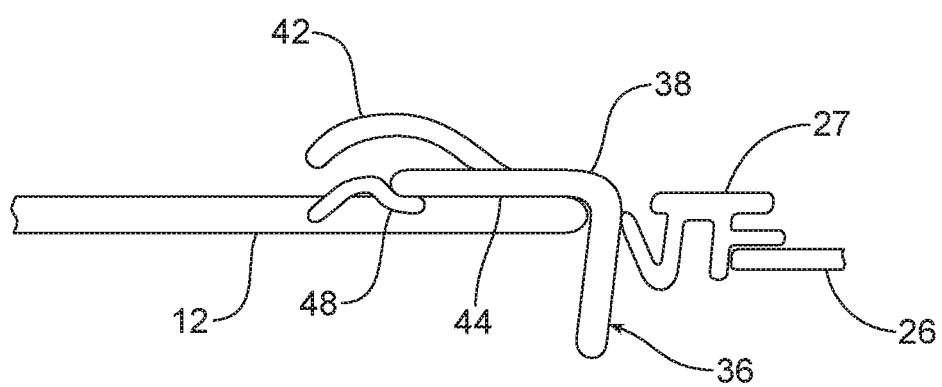
FIG. 4 is a partial cross-sectional view of the windshield and trim member along a driver side edge of the windshield.

The second trim member 36 includes an outboard portion 38 which is attached to the windshield 12 and an inboard portion 40. As best shown in FIG. 3, the inboard portion 40 includes a first portion 42 offset to the windshield 12. The first portion 42 forms the gutter using the windshield 12 and second trim member 36. A second portion 44 of the inboard portion 40 is substantially flush to the windshield 12 over at least a portion of a drain 46 as shown in FIG. 4. A seal 48 (e.g., a lip seal) is used to seal a gap between the windshield 12 and the second portion 44 of the inboard portion 40 of the second trim member 36.

Returning to FIG. 2, reference numeral 46 generally shows the drain which is essentially a notch or void formed in an upper corner of the driver side edge 28 of the windshield 12 in the described embodiment. The drain 46 may take any form sufficient to allow fluid to pass through the windshield 12 and need not be limited to the upper corners of the windshield.

In the described embodiment, the notch is defined by a notch side edge 50 and a notch top edge 52. As shown, an upper edge 54 of the second trim member 36 extends past the notch top edge 52 in the described embodiment to allow the fluid to enter the drain 46 before the second portion 44 of the inboard portion 40 and a second portion 56 of the outboard portion 38 of the second trim member 36 become flush with the windshield 12 and the A-pillar 14 and door 26 over the drain such that the drain is hidden from view outside of the vehicle 10. In alternate embodiments, one or both of the second portion 44 of the inboard portion 40 and the second portion 56 of the outboard portion 38 of the second trim member 36 may remain elevated above the windshield 12.

As shown by action arrows A, airflow onto the windshield 12 when the vehicle 10 is moving forward pushes fluid to the side edge 28 of the windshield. There, the fluid is collected within the gutter formed by the second trim member 36 and the windshield 12, and directed or guided up the windshield and into the drain 46. Once the fluid enters the drain 46, the effect of the airflow is minimized and the fluid simply drains out the bottom of the A-pillar 14 between the windshield 12 and the A-pillar due to the effects of gravity.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A vehicle having a fluid management trim system, comprising:
 a windshield supported along a lower edge by a cowl, along an upper edge by a roof, and along a side edge by a pillar, said pillar extending between a side door and said roof; and
 a trim member extending along and supported by said side edge of said windshield, wherein said side edge of said windshield extends at least partially around said pillar and from said lower edge to a position below said upper edge forming a void in said windshield and said trim member forms a gutter within which fluid travels along said windshield.

2. The vehicle of claim 1, wherein said trim member includes an outboard portion attached to said side edge of said windshield and an inboard portion offset to said windshield forming said gutter along at least a portion of said windshield.

3. The vehicle of claim 2, wherein said inboard portion of said trim member is substantially flush with said windshield over at least a portion of said void.

4. The vehicle of claim 3, further comprising a seal positioned between said windshield and said inboard portion of said trim member along said at least a portion of said void.

5. A fluid management trim system, comprising:
 a windshield having a drain formed in an upper corner of said windshield; and
 a trim member extending along a side edge of said windshield forming a channel for guiding fluid along said windshield toward said drain, wherein a first inboard portion of said trim member is offset to said windshield forming said channel.

6. The fluid management trim system of claim 5, wherein a second inboard portion of said trim member is substantially flush to said windshield.

7. The fluid management trim system of claim 6, wherein said second inboard portion of said trim member is substantially flush to said windshield and extends over at least a portion of said drain.

8. The fluid management trim system of claim 7, further comprising a seal positioned between said windshield and at least a portion of said second inboard portion of said trim member.

9. The fluid management trim system of claim 8, wherein said seal is positioned between said windshield and said second inboard portion of said trim member over at least said portion of said drain.

10. The fluid management trim system of claim 5, wherein a first outboard portion of said trim member is attached to said windshield and a second outboard portion of said trim member and a second inboard portion of said trim member are substantially flush to said windshield and said second inboard portion extends over said drain.

11. The fluid management trim system of claim 5, wherein an outboard portion of said trim member is attached to said windshield.

12. The fluid management trim system of claim 11, wherein a second inboard portion of said trim member is substantially flush to said windshield.

13. The fluid management trim system of claim 12, wherein said second inboard portion of said trim member is substantially flush to said windshield and extends over at least a portion of said drain.

14. The fluid management trim system of claim 13, further comprising a seal positioned between said windshield and at least a portion of said second inboard portion of said trim member.

15. A vehicle including the fluid management trim system of claim 5.

16. A vehicle having a fluid management trim system, comprising:
 a windshield supported along a lower edge by a cowl, along an upper edge by a roof, and along a side edge by a pillar, said pillar extending from a side door toward said roof; and
 a trim member extending along said side edge of said windshield forming a channel for guiding fluid along said windshield toward a drain, wherein said side edge of said windshield extends at least partially around said pillar and from said lower edge to a first position below said upper edge forming said drain.

17. The vehicle of claim 16, wherein a portion of said trim member is offset to said windshield forming said channel.

18. The vehicle of claim 17, wherein said portion of said trim member offset to said windshield extends from said lower edge to a second position below said upper edge and over said drain.

* * * * *